United States Patent
Touahri et al.

(10) Patent No.: US 11,639,873 B2
(45) Date of Patent: May 2, 2023

(54) HIGH RESOLUTION MULTI-PASS OPTICAL SPECTRUM ANALYZER

(71) Applicant: VIAVI SOLUTIONS INC., San Jose, CA (US)

(72) Inventors: Driss Touahri, Nepean (CA); Christopher Russell Wagner, Kanata (CA)

(73) Assignee: VIAVI SOLUTIONS INC., Chandler, AZ (US)

(*) Notice: Subject to any disclaimer, the term of this patent is extended or adjusted under 35 U.S.C. 154(b) by 76 days.

(21) Appl. No.: 16/849,552

(22) Filed: Apr. 15, 2020

(65) Prior Publication Data
US 2021/0325245 A1  Oct. 21, 2021

(51) Int. Cl.
| | |
|---|---|
| *G01J 3/18* | (2006.01) |
| *G01J 3/14* | (2006.01) |
| *G01J 3/26* | (2006.01) |
| G01J 3/28 | (2006.01) |
| G01J 3/12 | (2006.01) |

(52) U.S. Cl.
CPC .......... *G01J 3/18* (2013.01); *G01J 3/14* (2013.01); *G01J 3/26* (2013.01); *G01J 2003/1204* (2013.01); *G01J 2003/1208* (2013.01); *G01J 2003/262* (2013.01); *G01J 2003/283* (2013.01)

(58) Field of Classification Search
CPC ........ G01J 3/18; G01J 3/14; G01J 3/26; G01J 2003/283; G01J 2003/262; G01J 2003/1208; G01J 2003/1204
See application file for complete search history.

(56) References Cited

U.S. PATENT DOCUMENTS

| | | | | |
|---|---|---|---|---|
| 3,069,967 A | * | 12/1962 | White | G01J 3/18 362/346 |
| 3,503,685 A | * | 3/1970 | Driscoll | G01J 3/04 356/329 |
| 4,211,486 A | * | 7/1980 | Magnussen, Jr. | G01J 3/06 356/334 |
| 4,453,826 A | * | 6/1984 | Witte | G01J 3/18 356/33 |
| 4,852,079 A | * | 7/1989 | Kinney | G01J 3/02 356/305 |
| 4,969,739 A | * | 11/1990 | McGee | H02P 7/04 356/334 |
| 4,973,159 A | * | 11/1990 | Sohma | G01N 21/75 356/334 |
| 5,177,560 A | * | 1/1993 | Stimple | G01J 3/28 356/328 |
| 5,699,156 A | * | 12/1997 | Carver | G01J 3/02 356/411 |

(Continued)

*Primary Examiner* — Mohamed K Amara
(74) *Attorney, Agent, or Firm* — Mannava & Kang, P.C.

(57) ABSTRACT

A system for a high resolution optical spectrum analyzer (OSA) using an efficient multi-pass configuration is disclosed. The system may include an entrance slit to allow inward passage of an optical beam. The system may also include a grating element to diffract the optical beam. The system may further include a retroreflective element to retroreflect the optical beam. The system may also include a mirror to reflect the optical beam. The system may include an exit slit, which in some examples may be adjacent to the entrance slit. The exit slit may allow outward passage of the optical beam for a high resolution optical measurement.

18 Claims, 5 Drawing Sheets

(56) References Cited

U.S. PATENT DOCUMENTS

| | | | | |
|---|---|---|---|---|
| 5,812,262 | A * | 9/1998 | Ridyard | G01J 3/0259 356/328 |
| 5,835,210 | A * | 11/1998 | Ershov | G01J 3/18 356/328 |
| 5,880,834 | A * | 3/1999 | Chrisp | G01J 3/18 356/328 |
| 5,886,785 | A * | 3/1999 | Lefevre | G01J 3/18 356/334 |
| 5,963,333 | A * | 10/1999 | Walowit | G01J 3/0251 356/328 |
| 6,061,129 | A * | 5/2000 | Ershov | G01J 3/18 356/328 |
| 6,166,805 | A * | 12/2000 | Mori | G01J 3/1804 356/334 |
| 6,249,346 | B1 * | 6/2001 | Chen | G01J 3/02 356/328 |
| 6,862,092 | B1 * | 3/2005 | Ibsen | G01J 3/00 356/328 |
| 7,075,082 | B2 * | 7/2006 | Tsao | G01J 3/02 250/339.07 |
| 7,148,488 | B2 * | 12/2006 | Horton | G01N 21/33 250/372 |
| 7,161,673 | B2 * | 1/2007 | Da Silva | G01J 3/02 356/328 |
| 7,180,590 | B2 * | 2/2007 | Bastue | G01J 3/02 356/326 |
| 7,253,897 | B2 * | 8/2007 | Moon | G01J 3/28 356/334 |
| 7,315,378 | B2 * | 1/2008 | Phelan | G01N 21/4738 356/39 |
| 7,616,306 | B2 * | 11/2009 | Brady | G06T 9/00 356/310 |
| 7,808,635 | B2 * | 10/2010 | Chrisp | G01J 3/0294 356/326 |
| 7,812,949 | B2 * | 10/2010 | Delmas | G01J 3/18 356/326 |
| 7,817,272 | B2 * | 10/2010 | Koeppen | G01J 3/02 356/326 |
| 7,817,274 | B2 * | 10/2010 | Zhang | G01J 3/0291 356/328 |
| 7,864,317 | B2 * | 1/2011 | Bockstaele | G01J 3/02 356/328 |
| 8,368,885 | B2 * | 2/2013 | Shibayama | G01J 3/0291 356/326 |
| 8,390,806 | B1 * | 3/2013 | Subramanian | G01J 3/0259 356/328 |
| 8,564,775 | B2 * | 10/2013 | Wein | G02B 6/29323 356/328 |
| 8,804,118 | B2 * | 8/2014 | Shibayama | G01J 3/0243 356/328 |
| 8,823,932 | B2 * | 9/2014 | Comstock, II | G01J 3/2823 356/328 |
| 8,861,060 | B2 * | 10/2014 | Puegner | G01J 3/021 359/209.1 |
| 9,638,686 | B1 * | 5/2017 | Cafferty | G01J 3/0286 |
| 9,851,247 | B2 * | 12/2017 | Shibayama | G01J 3/021 |
| 10,359,315 | B2 * | 7/2019 | Nakai | G03G 15/01 |
| 10,514,296 | B2 * | 12/2019 | Han | G01J 3/0208 |
| 10,775,236 | B2 * | 9/2020 | Yokino | G01J 3/0289 |
| 10,876,888 | B2 * | 12/2020 | Pylkkanen | G01J 3/36 |
| 2002/0060792 | A1 * | 5/2002 | Ibsen | G01J 3/18 356/328 |
| 2003/0081208 | A1 * | 5/2003 | Kaneko | G01J 3/1804 356/334 |
| 2004/0246477 | A1 * | 12/2004 | Moon | H04B 10/07955 356/300 |
| 2004/0263861 | A1 * | 12/2004 | Rafac | G01J 3/0205 356/519 |
| 2005/0073679 | A1 * | 4/2005 | He | G01J 3/0202 356/328 |
| 2005/0243312 | A1 * | 11/2005 | Geshwind | G01J 3/10 356/310 |
| 2006/0012786 | A1 * | 1/2006 | Goto | G01J 3/04 356/451 |
| 2006/0038994 | A1 * | 2/2006 | Chrisp | G01J 3/2823 356/328 |
| 2006/0038997 | A1 * | 2/2006 | Julian | G01J 3/0237 356/328 |
| 2006/0103841 | A1 * | 5/2006 | Ohishi | G01J 3/0224 356/328 |
| 2006/0268269 | A1 * | 11/2006 | Warren | G01J 3/0259 356/328 |
| 2007/0194239 | A1 * | 8/2007 | McAllister | G01J 3/0229 250/339.07 |
| 2007/0252989 | A1 * | 11/2007 | Comstock | G02B 5/1852 356/328 |
| 2009/0262346 | A1 * | 10/2009 | Egloff | G01J 3/02 356/326 |
| 2009/0273840 | A1 * | 11/2009 | McLaughlin | G02B 6/2931 359/569 |
| 2010/0014082 | A1 * | 1/2010 | Loecklin | G01J 3/1804 356/330 |
| 2013/0114077 | A1 * | 5/2013 | Zhang | G01N 33/48 356/328 |
| 2013/0188181 | A1 * | 7/2013 | Angel | G01N 21/65 356/301 |
| 2013/0242308 | A1 * | 9/2013 | Zhan | G01N 21/8483 356/445 |
| 2014/0118738 | A1 * | 5/2014 | Comstock, II | G01J 3/24 356/328 |
| 2015/0241277 | A1 * | 8/2015 | Correns | G01J 3/0259 356/305 |
| 2015/0300876 | A1 * | 10/2015 | Acher | G01J 3/447 356/327 |
| 2016/0195433 | A1 * | 7/2016 | Kaneko | G01J 3/0208 359/494.01 |
| 2016/0245693 | A1 * | 8/2016 | Perez Calero | G01J 3/18 |
| 2017/0184453 | A1 * | 6/2017 | Wang | G01J 3/36 |
| 2018/0128683 | A1 * | 5/2018 | Hosseini | G01J 3/18 |
| 2019/0302368 | A1 * | 10/2019 | Kitawaki | G01J 3/10 |
| 2019/0368931 | A1 * | 12/2019 | Grueger | G01J 3/14 |
| 2020/0124476 | A1 * | 4/2020 | Mercuro | G01J 3/0208 |
| 2020/0182694 | A1 * | 6/2020 | Scarcelli | G01J 3/0256 |
| 2021/0003450 | A1 * | 1/2021 | Hunter | G01J 3/22 |
| 2022/0221340 | A1 * | 7/2022 | Aikens | G01J 3/2803 |

* cited by examiner

HIGH RESOLUTION MULTI-PASS OPTICAL SPECTRUM ANALYZER

TECHNICAL FIELD

This patent application is directed to optical measurement instrumentation for telecommunication networks, and more specifically, to a high resolution optical spectrum analyzer (OSA) using an efficient multi-pass configuration.

BACKGROUND

Optical measurement instrumentation, such as optical spectrometers or optical spectrum analyzers (OSAs), play an important role in modern scientific research. Optical spectrum analyzers (OSAs), in particular, are vital in fiber-optics and optical communication technologies. From research and development (R&D) applications to manufacturing, optical spectrum analyzers (OSAs) and other similar equipment have become essential to build and characterize a variety of fiber-optics products, such as broadband sources, optical sources, and wavelength division multiplexed (WDM) systems.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
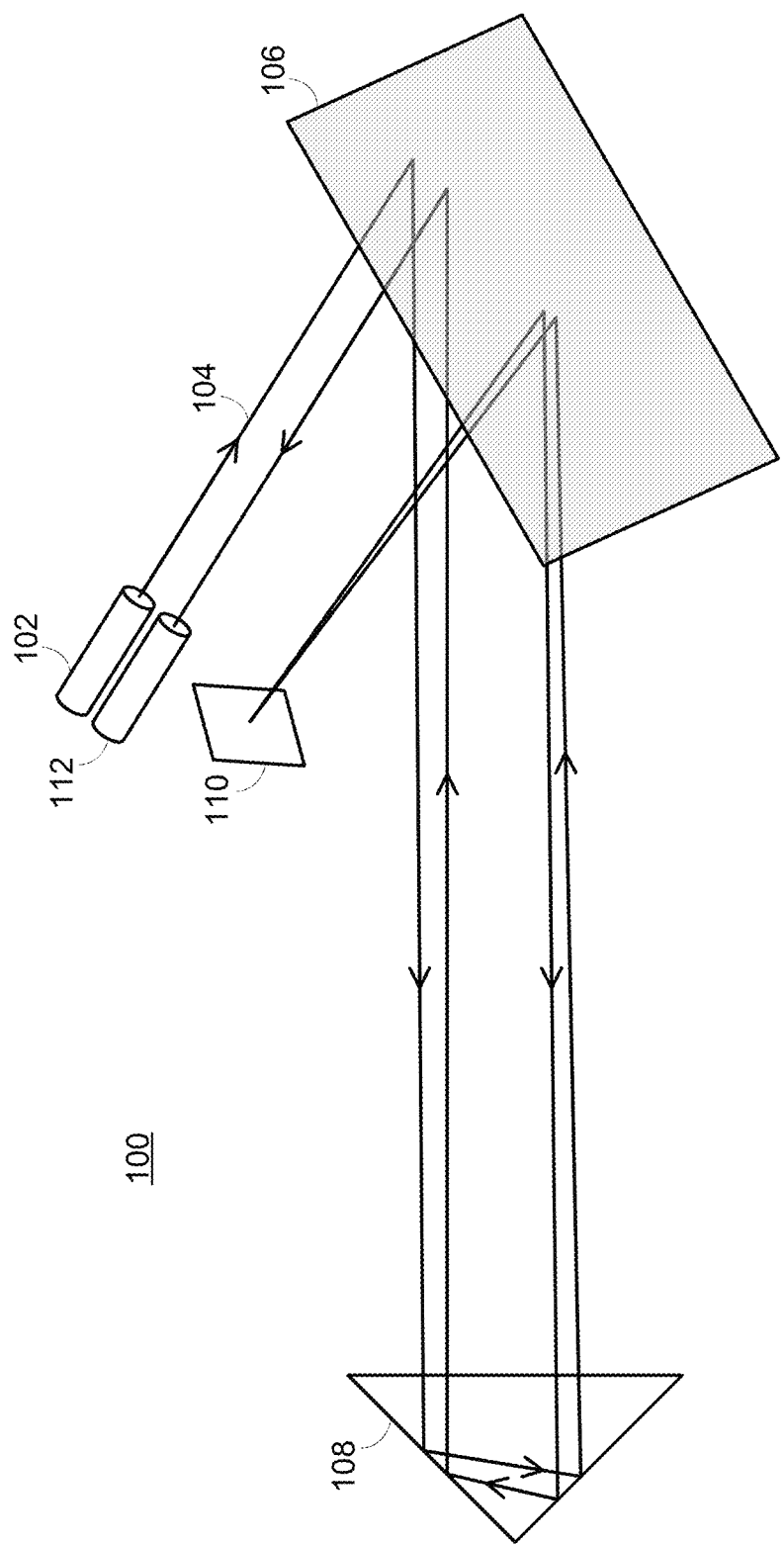
FIG. 1 illustrates a system for providing high resolution optical measurements, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

There are many types of optical spectrum analyzers (OSAs), such as Fabry-Perot-based, interferometer-based, and swept coherent heterodyne optical spectrum analyzers (OSAs). However, one of the most common optical spectrum analyzers (OSAs) for fiber-optics applications include diffraction grating based optical spectrum analyzers (OSAs). These may also be commonly referred to as monochromator-based optical spectrum analyzers (OSAs).

In a monochromator-based optical spectrum analyzer (OSA), for example, a broadband light from a bright and small light source may strike a diffraction grating. When this happens, a thin space between every two adjacent lines of the diffraction grating may become an independent "source," which may then diffract light off into a range of wavelet angles. For each wavelength and each specific angle, the diffracted wavelets may be generated at exactly one wavelength out of phase with one another, and may therefore add together constructively. In other words, light with a given wavelength may leave the diffraction grating at a specific angle. Also, the wider an illuminated portion of the diffraction grating, the higher the number of diffracted wavelets there may be, and therefore the narrower the diffracted beam pattern may become. This may enable a spectral resolution of the monochromator-based optical spectrum analyzer (OSA) to be proportional to the size of the illuminated portion of the diffraction grating.

Some grating-based optical spectrum analyzers (OSAs) include the use of a double-pass (or dual-pass, two-pass, or 2-pass) monochromator concept, which may incorporate an additional optical element, such as a retroreflective element. A technical issue associated with a double-pass monochromator based optical spectrum analyzer (OSA) may be the limited ability to generate higher resolutions. In order to achieve a higher optical resolution, a double-pass monochromator based optical spectrum analyzer (OSA), for instance, may require large, bulky, and/or expensive optics to be added on top of or to replace the already-existing optical elements. And even if a higher optical resolution can be achieved with these additions or replacements, the increased resolution remains limited to only a few tens of picometers (pm).

For example, in order to achieve a 10-picometer resolution in a double-pass monochromator based optical spectrum analyzer (OSA), a minimum 120-millimeter long diffraction grating may be required. Such a large diffraction grating may present several dimensional challenges. First, a 120-millimeter long diffraction grating may be difficult to manufacture with precision or ease. A grating of this length (or other enlarged dimension) may be prone to greater manufacturing error or other irregularities. Second, a grating of this type may be extremely sensitive and more susceptible to various environmental changes, making it less functional or reliable in any optical spectrum analyzer (OSA).

Another challenge of a double-pass monochromator based optical spectrum analyzer (OSA) may involve stray light and its adverse effects. Stray light may have a variety of origins. Its presence may be caused by a wide variety of design and manufacturing factors. The level of stray light due to the dispersed radiation inside a monochromator or spectrograph may be affected by the design of an instrument, its baffles, its interior finish, and/or other characteristics. In a double-pass monochromator based optical spectrum analyzer (OSA), for example, stray light may generally be attributed to what is commonly referred to as a Littrow condition. Because a double-pass monochromator based optical spectrum analyzer (OSA) design may use a mirror or a 90-degree prism reflector in a particular set configuration, Littrow stray light may always exist and may unfavorably find its way to an output or exit slit of the optical spectrum analyzer (OSA). Littrow stray light may cause a strong spurious peak that appears at a wavelength between 120 nm and 200 nm below the actual signal wavelength. In order to direct such stray light away from the output or exit slit, use of complicated optical elements may typically be required. Again, these elements may be expensive, difficult to manufacture, and/or hard to incorporate in an optical spectrum analyzer (OSA) without altering its compact design framework.

As described above, the systems and methods described herein may achieve high resolution optical measurements while maintaining comparable size or design of existing optical spectrum analyzers (OSAs). For example, the systems and methods described herein may include a multi-pass (e.g., four-pass) monochromator-based optical spectrum analyzer (OSA) design that enables light to be diffracted (e.g., by the same grating element) at least four times as it propagates between an input or entrance slit and an output or exit slit. Since wavelength separation of light is generally proportional to a number of times light interacts with the grating, a high resolution may be obtained with a single relatively small-sized grating. The systems and methods described herein may also provide better management and control of Littrow stray light that can cause adverse effects on optical measurements.

FIG. 1 illustrates a system 100 for providing high resolution optical measurements, according to an example. In some examples, the system 100 may depict a multi-pass optical spectrum analyzer (OSA). As shown, the system 100 may be a four-pass (4-pass or quad-pass) monochromator-based optical spectrum analyzer (OSA). The system 100 may include an input or entrance slit 102, an optical beam 104, a grating element 106, a retroreflective element 108, a mirror element 110, and an output or exit slit 112.

It should be appreciated that one or more additional optical elements may also be provided. For example, a light source (not shown) may be provided upstream of the input or entrance slit 102 to generate a broadband beam, light, or optical signal. A light detector (not shown) may also be provided downstream of the output or exit slit 11 to collect and measure the optical beam 104. Other optical elements may also be provided. For instance, one or more collimators or lenses may be provided between the input slit 102/output or exit slit 112 and the grating element 106 to collimate or focus the optical beam 104 as needed. For simplicity, the components and elements shown in system 100 may helpful to illustrate the multi-pass configuration and design to achieve a high resolution optical measurements.

The input or entrance slit 102 and output or exit slit 112 may enable or allow the optical beam 104 to pass through. In some examples, the input or entrance slit 102 and output or exit slit 112 may be positioned by 1 millimeter (mm) or less apart. Other distances, dimensions, or variations may also be provided to obtain the desired optical measurement. It should be appreciated that the input or entrance slit 102 or output or exit slit 112 may be physical apertures, optical fibers, and/or other mechanisms to communicatively transmit or receive optical beams.

In some examples, the grating element 106 may be a diffraction grating. As such, the diffraction grating may be an optical component with a periodic structure that splits or diffracts light into separate beams that may also travel in different directions. In some examples, the diffraction grating may be a ruled, holographic, or other similar diffraction grating. The grating element 106 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating element 106 may also be made from a variety of materials. This may include any number of isotropic materials, such as, but not limited to, SCHOTT N-BK7, fused silica, borosilicate, and/or any family of equivalents, e.g., from other glass catalogs, etc. In some examples, the grating element 106 to be used in system 100 may be selected based on any number of factors to optimize the resolution of the optical spectrum analyzer (OSA). This may include factors, such as grating efficiency, incidence angle, blaze wavelength, wavelength range, stray light, resolving power, etc.

Figure 2A:
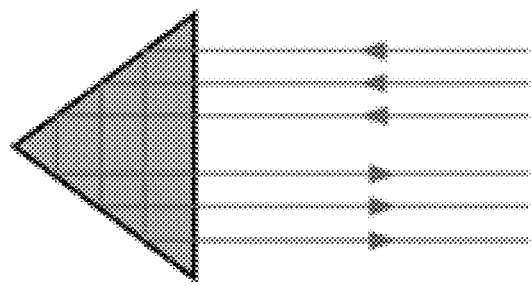
FIGS. 2A-2C illustrate various configurations for a retroflection element in a high resolution optical spectrum analyzer (OSA), according to an example.
Figure 2B:
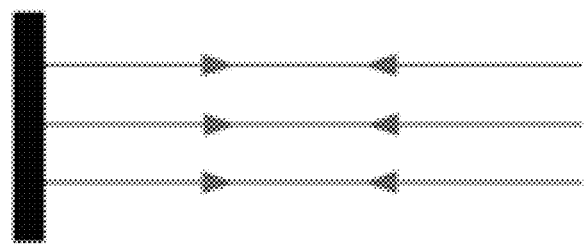
Figure 2C:
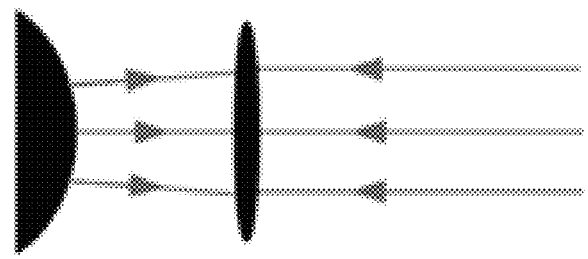

The retroreflective element 108 may include any number of retroreflective element configurations to provide retroreflection or other similar function. For example, FIGS. 2A-2C illustrate various retroreflective element configurations 200A-200C that may be used in a high-resolution optical spectrum analyzer (OSA), according to an example. As shown in FIG. 2A, the retroreflective element 108 of the first configuration 200A may be a prism reflector. As shown in FIG. 2B, the retroreflective element 108 of the second configuration 200B may be a flat mirror. As shown in FIG. 2C, the retroreflective element 108 of the third configuration 200C may include a mirror and lens combination. In some examples, the mirror may be a convex mirror and the lens may be a focusing lens. Although the examples described herein are directed to these various retroreflective element configurations 200A-200C, it should be appreciated that other retroreflective element configurations, or combinations of such configurations, may also be provided.

Referring back to system 100 of FIG. 1, the mirror element 110 may be a flat mirror or other reflective element. These may include, but not limited to, prisms, mirrors, lenses, reflectors, and/or any combination thereof. Other various optical or reflective elements may also be provided.

As shown in system 100 of FIG. 1, the optical beam 104 may travel from the input or entrance slit 102 to the grating element 106, where it is diffracted to the retroreflective element 108, where it is retroreflected back to the grating element 106 again, and then diffracted to the mirror element 110, at which point the optical beam 104 is reflected back to the grating element 106 and diffracted to the retroreflective element 108, then retroreflected again to the grating element 106, where the optical beam 104 is again diffracted and directed to the output to exit slit 112 for optical measurement (e.g., at a detector). In this way, the optical beam 104 passes through the grating element 106 four (4) times, the retroreflective element 108 twice, and the mirror element 110 once. Because the optical beam 104, in this example, passes through the same grating element 106 four times between the input or entrance slit 102 and the output or exit slit 112, the multi-pass monochromator-based optical spectrum analyzer (OSA) of system 100 may be referred to as a four-pass (4-pass or quad-pass) monochromator-based optical spectrum analyzer (OSA) that is able to achieve twice the resolution of a two-pass (2-pass or dual-pass) monochromator-based optical spectrum analyzer (OSA). And all this may be accomplished without adding or replacing optical components with larger, bulkier, or more expensive ones or significantly altering the basic design of existing systems.

The system 100 may also be equipped to manage and control stray light. As described above, in a double-pass monochromator based optical spectrum analyzer (OSA), Littrow stray light may always exist and find its way to an output of exit slit. This may be exacerbated by the use of a 90-degree prism reflector, for example, in a double-pass monochromator based design. As a result, Littrow stray light may cause a strong spurious peak that appears at a wavelength between 120 nm and 200 nm below the actual signal wavelength.

After an input light beam that originates from a light source strikes the grating element 106, the optical beam 104 may be dispersed in a plane of incidence that is, for example, perpendicular to the grating lines. For a given position of the retroreflective element 108, only one wavelength, called Lambda signal or $\lambda_s$, may trace its way back to the grating element 106. In a double-pass monochromator based optical spectrum analyzer (OSA), this lone wavelength may then be coupled back to the output or exit slit 112. Other beams with different wavelengths, however, may be diffracted at different angles, and therefore may not be normal to the retroreflective element 108. As a result, these other wavelengths may be retroreflected back towards the grating 106 at different incidence angles.

It should be appreciated that the relationship between a grating spacing and angles of the incident and diffracted beams of light may be explained by a so-called grating equation. According to the Huygens-Fresnel principle, each point on the wavefront of a propagating wave may be considered to act as a point source, and the wavefront at any subsequent point may be found by adding together the contributions from each of these individual point sources. As described, gratings may be "reflective" or "transmissive" type, similar to that of a mirror or lens, respectively. A grating may have a "zero-order mode" (where m=0), in which there may be no diffraction and a ray of light behaves according to the laws of reflection and refraction the same as with a mirror or lens, respectively.

An ideal grating may be made up of a set of slits of spacing d, that must be wider than the wavelength of interest to cause diffraction. Assuming a plane wave of monochromatic light of wavelength A with normal incidence (perpendicular to the grating), each slit in the grating may act as a quasi point-source from which light propagates in all directions (although this may be typically limited to a hemisphere). After light interacts with the grating, the diffracted light may be composed of the sum of interfering wave components emanating from each slit in the grating. At any given point in space through which diffracted light may pass, the path length to each slit in the grating may vary. Since path length varies, generally, so may the phases of the waves at that point from each of the slits. Thus, they may add or subtract from each other to create peaks and valleys through additive (constructive) and/or destructive interference. When the path difference between the light from adjacent slits is equal to half the wavelength, $\lambda/2$, the waves may be out of phase, and thus cancel each other to create points of minimum intensity. Similarly, when the path difference is $\lambda$, the phases may add together and maxima occur. The maxima may occur at angles $\theta_m$, which satisfy the relationship:

$$d \sin \theta_m / \lambda = |m|,$$

where $\theta_m$ may represent an angle between the diffracted ray and a grating's normal vector, d may represent a distance from the center of one slit to the center of the adjacent slit, and m may represent an integer representing the propagation-mode of interest.

Thus, when light is normally incident on the grating, the diffracted light may have maxima at angles $\theta_m$, expressed by the following:

$$d \sin \theta_m = m\lambda.$$

If a plane wave is incident at any arbitrary angle $\theta_i$, the grating equation may become:

$$d(\sin \theta_i - \sin \theta_m) = m\lambda.$$

When solved for the diffracted angle maxima, the equation may then be expressed as follows:

$$\theta_m = \arcsin(\sin \theta_i - (m\lambda/d)).$$

It should be appreciated that these equations or expressions may assume that both sides of the grating are in contact with the same medium (e.g., air). Light that corresponds to direct transmission (or specular reflection in the case of a reflection grating) may be called a zero order, and may be denoted m=0. The other maxima may occur at angles represented by non-zero integers m. Note that m may be positive or negative, resulting in diffracted orders on both sides of the zero order beam.

Again, this derivation of the grating equation may be based on an idealized grating element. However, the relationship between angles of the diffracted beams, grating spacing, and/or wavelength of the light may apply to any regular structure of the same spacing because phase relationship between light scattered from adjacent elements of the grating may generally remain the same. The detailed distribution of diffracted light may therefore depend on a detailed structure of the grating element(s) as well as on the number of elements in the grating structure, but it may typically provide maxima in the directions given by the grating equation.

Figure 3A:
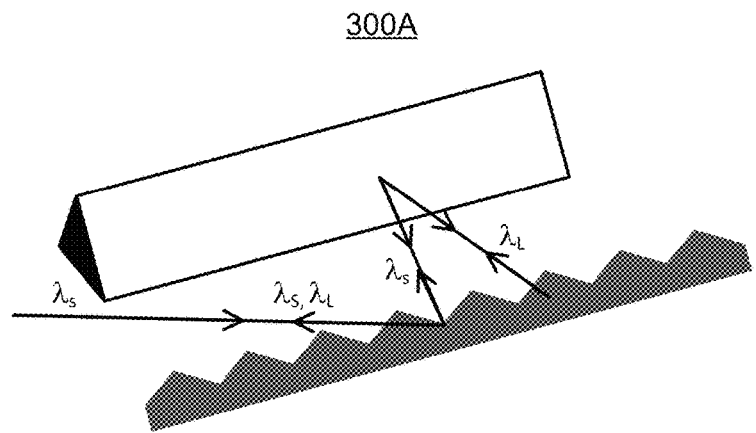
FIG. 3A illustrates an optical path for light between a retroreflector and a grating, according to an example.

Now according to the grating equation, and for every Lambda signal $\lambda_s$, there may be a wavelength, called Lambda Littrow or $\lambda_L$, that may be between 120 nm and 200 nm below $\lambda_s$, and that may strike the grating in an optical path, as shown in the FIG. 3A. FIG. 3A illustrates an optical path in a configuration 300A (e.g., Littrow configuration) for light between a retroreflector and a grating, according to an example. In other words, these optical signals may be diffracted back along its incident path, as shown in the optical path configuration 300A of FIG. 3A. Because a double-pass monochromator based optical spectrum analyzer (OSA) design typically uses a 90-degree prism reflector, Littrow stray light may be a natural but undesirable result unless there is to manage or control it.

Figure 3B:
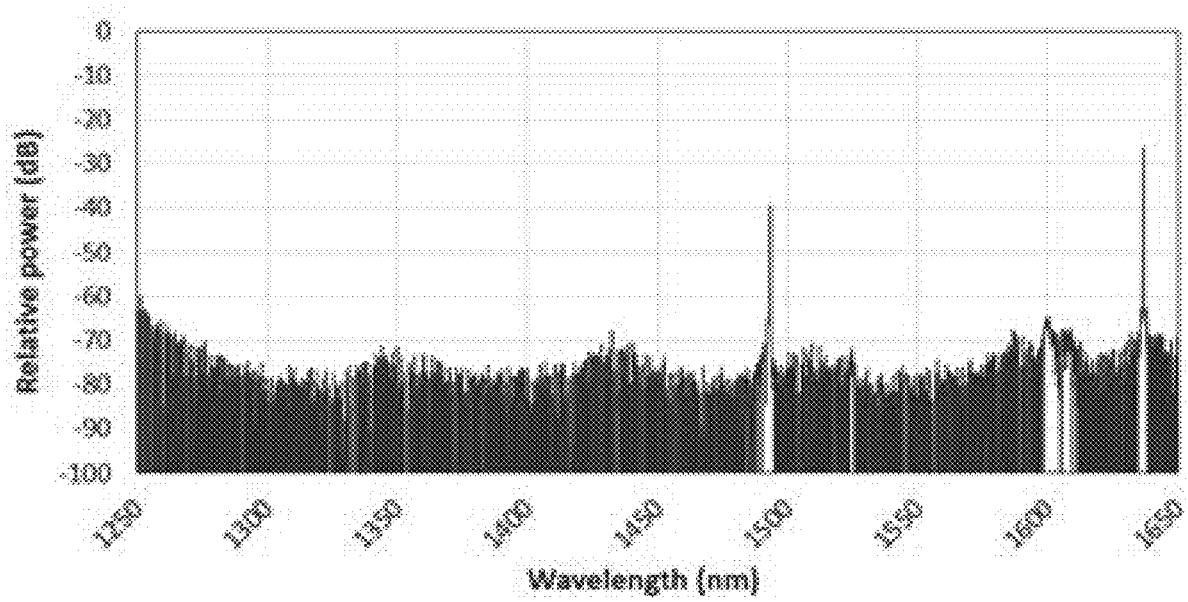
FIG. 3B illustrates a graph for identifying Littrow stray light in a monochromator-based optical spectrum analyzer (OSA), according to an example.

FIG. 3B illustrates a graph for identifying Littrow stray light in a monochromator-based optical spectrum analyzer (OSA), according to an example. As shown, Littrow stray light in a dual-pass monochromator can be seen in a peak around 1550 nm with the main peak at 1637 nm.

In order to direct such stray light away from the output or exit slit, complicated optical elements may typically be required, with the effect of altering or drastically change the design of a two-pass monochromator. The multi-pass high resolution optical spectrum analyzer (OSA), as described herein, may help, among other things, obviate these issues.

In the multi-pass design of system 100 of FIG. 1, even if the Littrow stray light or a portion of it find its way through the output or exit slit 112 to be captured by the detector (not shown), the system 100 may manage Littrow stray light. In some examples, the system 100 may adjust the orientation of the retroreflective element 108 and/or the mirror 110. For instance, one or more of these elements may be adjusted in at least one of three dimensions (e.g., pitch, roll, and yaw) to redirect the optical beam 104 away from the plane of incidence where the Littrow light is being generated. Accordingly, Littrow stray light may easily be managed by the high-resolution optical spectrum analyzer (OSA) of system 100 using the same or relatively similar sized optical elements.

Figure 4:
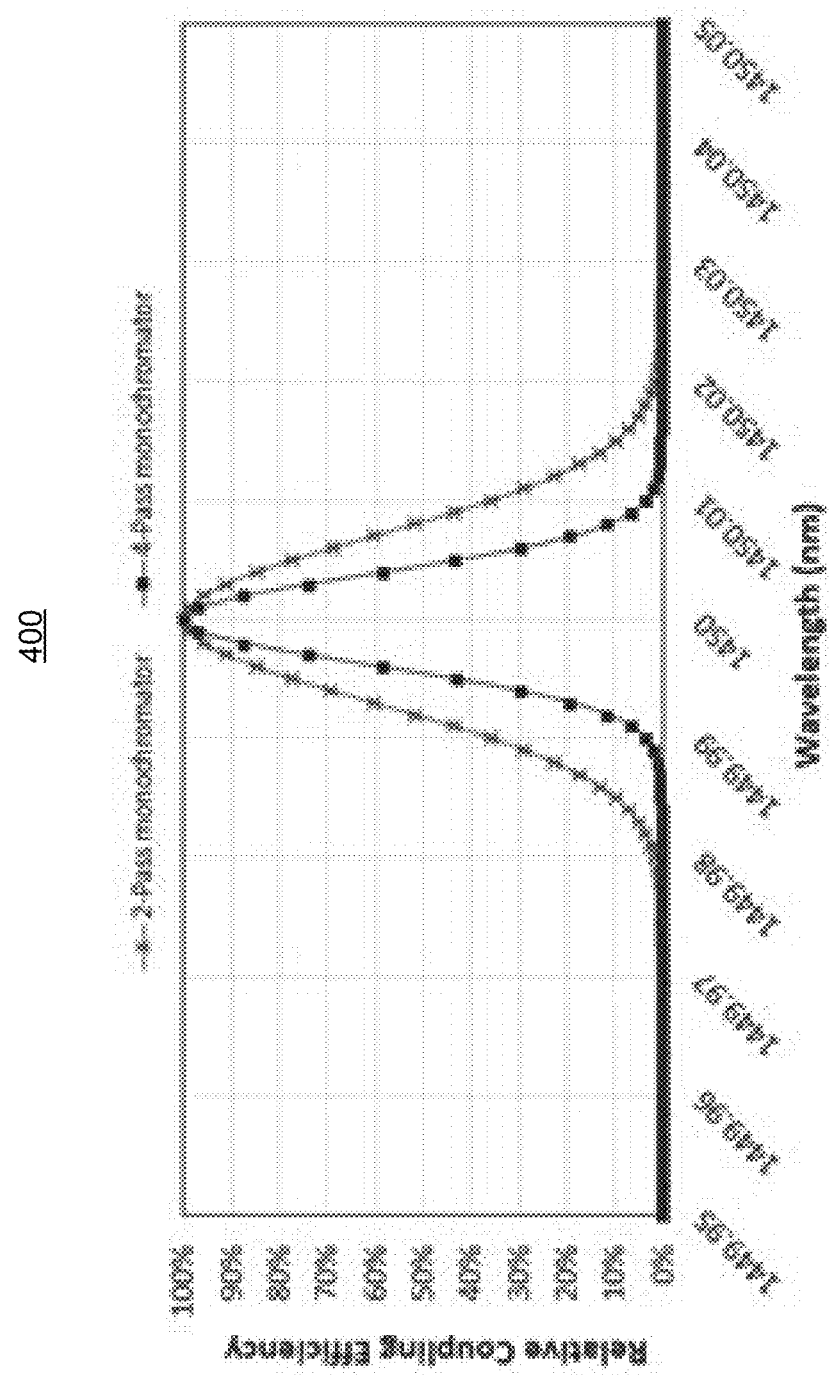
FIG. 4 illustrates a graph of comparing relative resolutions of a 2-pass monochromator and a 4-pass monochromator, according to an example.

FIG. 4 illustrates a graph of comparing relative resolutions of a dual-pass (2-pass) monochromator and a four-pass (4-pass) monochromator, according to an example. As shown, the resolution bandwidth of the four-pass (4-pass) monochromator is narrower (e.g., half as wide) than that of the dual-pass (2-pass) monochromator, which may result in approximately twice the resolution.

Figure 5:
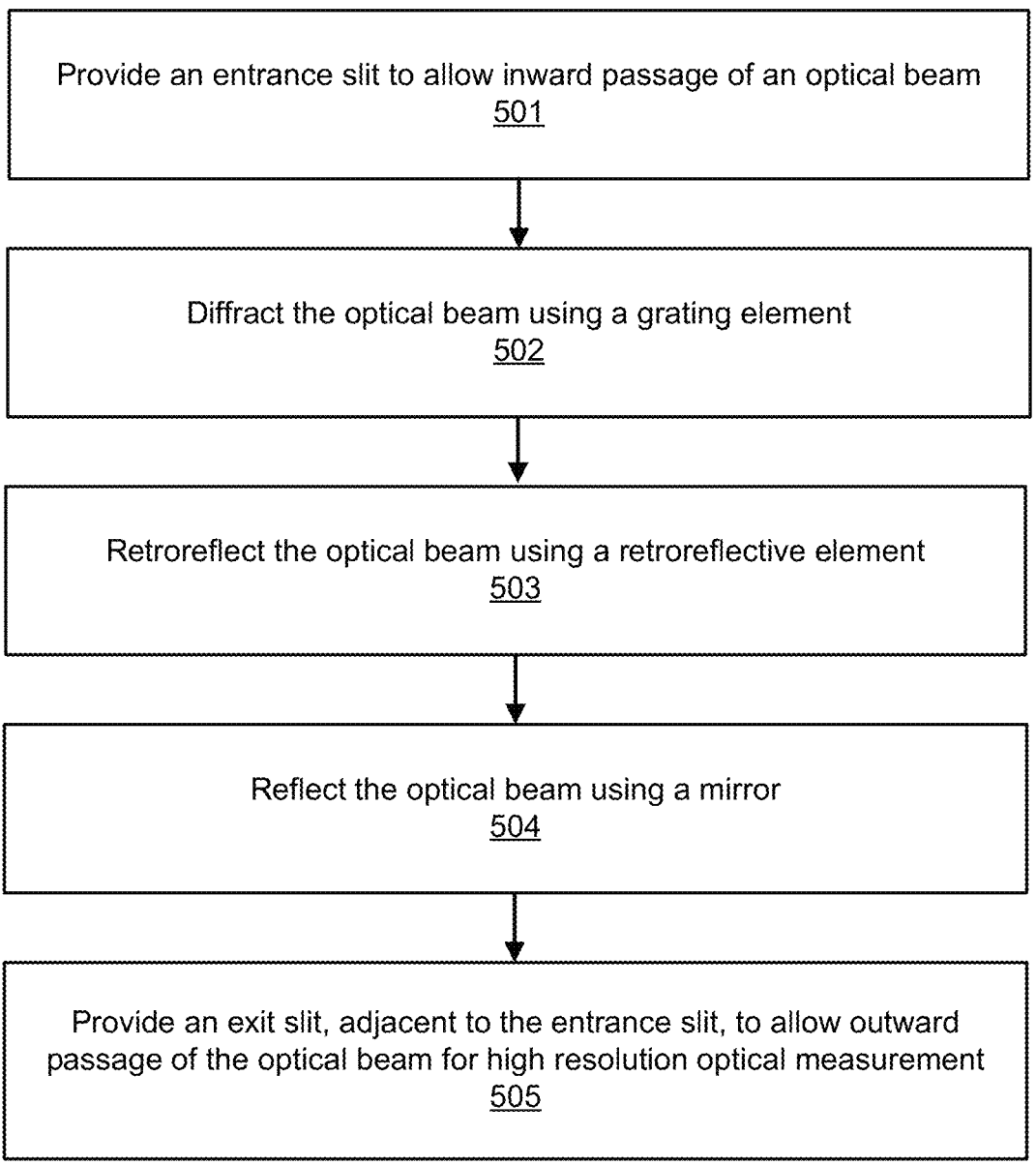
FIG. 5 illustrates a flow chart of a method for providing a high resolution optical spectrum analyzer (OSA) system, according to an example.

FIG. 5 illustrates a flow chart of a method for providing a high-resolution optical spectrum analyzer (OSA) system, according to an example. The method 500 is provided by way of example, as there may be a variety of ways to carry out the method described herein. Although the method 500 is primarily described as being performed by the system 100 of FIG. 1, the method 500 may be executed or otherwise performed by one or more processing components of another system or a combination of systems. Each block shown in FIG. 5 may further represent one or more processes, methods, or subroutines, and one or more of the blocks may include machine readable instructions stored on a non-transitory computer readable medium and executed by a processor or other type of processing circuit to perform one or more operations described herein.

At block 501, an entrance slit may be provided to allow inward passage of an optical beam. In some examples, the optical beam passes through the grating element at least four times, the retroreflective element at least two times, and the mirror at least one time.

At block 502, the optical beam may be diffracted. In some examples, this may be achieved using a grating element, such as a diffraction grating.

At block 503, the optical beam may be retroreflected. In some examples, this may be achieved using a retroreflective element. The retroreflective element may be a prism, a flat mirror, a convex mirror and lens, or other optical or reflective element.

At block, 504, the optical beam may be reflected using a mirror or other reflective element. In some examples, the retroreflective element or the mirror may be adjustable to reduce stray light (e.g., Littrow stray light) from passing through the exit slit. In some examples, this may be achieved by tilting the mirror away from normal incidence.

At block 505, an exit slit may be provided. As described above, the exit slit, in some examples, may be adjacent to the entrance slit. The exit slit may allow outward passage of the optical beam for high resolution optical measurement. In some examples, the entrance slit and the exit slit may be separated by 1 millimeter or less.

It should be appreciated that the method may be used in at least one of a multi-pass optical spectrum analyzer (OSA), ultra-narrow band tunable filter, or an extended cavity diode laser.

As mentioned above, there may be numerous ways to configure or position the various optical elements of the system 100, such as the grating element 106, the retroreflective element 108, and/or the mirror 110. Although these may be adjusted to reduce or eliminate Littrow stray light, as described herein, adjusting these and other components may also provide more a more efficient or compact design for the optical path of the optical beam 104. In this way, other electrical, thermal, mechanical and/or design advantages may also be obtained.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the systems and methods described herein may facilitate more reliable and accurate optical measurements. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems, such as optical spectrum analyzers (OSAs), it should be appreciated that the systems and methods described herein may also be used in other various systems and other implementations. For example, these may include an ultra-narrow band tunable filter, an extended cavity diode laser, and/or applied stages to further increase the spectral resolution of various test and measurement systems. In fact, there may be numerous applications in optical communication networks and fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related optical measurements. For example, the systems and methods described herein may allow for a high resolution (e.g., picometer-level) optical resolution using an efficient and cost-effective design concept that also facilitates the reduction or elimination of Littrow stray light.

With additional advantages that include high resolution, low number of optical elements, efficient cost, and small form factor, the systems and methods described herein may be beneficial in many original equipment manufacturer (OEM) applications, where they may be readily integrated into various and existing network equipment, fiber sensor systems, test and measurement instruments, or other systems and methods. The systems and methods described herein may provide mechanical simplicity and adaptability to small or large optical measurement devices. Ultimately, the systems and methods described herein may increase resolution, minimize adverse effects of stray light, and improve measurement efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
    an entrance slit to allow inward passage of an optical beam;
    a grating element to receive the optical beam and diffract the optical beam;
    a retroreflective element to directly receive the diffracted optical beam and retroreflect the diffracted optical beam back to the grating element;
    a mirror, located adjacent to the entrance slit, to receive the diffracted and retroreflected optical beam from the grating element and reflect the diffracted and retroreflected optical beam back to the grating element, wherein the optical beam passes through the grating element four times, the retroreflective element two times, and the mirror one time; and
    an exit slit, adjacent to the entrance slit and the mirror, to allow outward passage of the optical beam that has passed through the grating element four times for a resolution optical measurement.

2. The system of claim 1, wherein the system is a multi-pass optical spectrum analyzer (OSA).

3. The system of claim 1, wherein the entrance slit and the exit slit are separated by 1 millimeter or less.

4. The system of claim 1, wherein the grating element is a diffraction grating element.

5. The system of claim 1, wherein the retroreflective element comprises one of a prism, a flat mirror, or a convex mirror and lens.

6. The system of claim 1, wherein at least one of the retroreflective element or the mirror is adjustable to reduce stray light from passing through the exit slit.

7. The system of claim 6, wherein: the stray light is Littrow stray light and the mirror is tilted away from normal incidence.

8. The system of claim 1, wherein the system is used in at least one of an ultra-narrow band tunable filter or an extended cavity diode laser.

9. A method for providing a configuration for a resolution optical measurement, comprising:
    providing an entrance slit to allow inward passage of an optical beam;
    providing a grating element to receive the optical beam and diffract the optical beam;
    providing a retroreflective element to receive the diffracted optical beam and retroreflect the diffracted optical beam back to the grating element;
    providing a mirror, located adjacent to the entrance slit, to receive the diffracted and retroreflected optical beam from the grating element and reflect the diffracted and retroreflected optical beam back to the grating element, wherein the optical beam passes through the grating element four times, the retroreflective element two times, and the mirror one time; and
    providing an exit slit, adjacent to the entrance slit and the mirror, to allow outward passage of the optical beam that has passed through the grating element four times.

10. The method of claim 9, wherein the configuration is used in at least one of a multi-pass optical spectrum analyzer (OSA), ultra-narrow band tunable filter, or an extended cavity diode laser.

11. The method of claim 9, wherein the entrance slit and the exit slit are separated by 1 millimeter or less.

12. The method of claim 9, wherein the grating element is a diffraction grating element.

13. The method of claim 9, wherein the retroreflective element comprises one of a prism, a flat mirror, or a convex mirror and lens.

14. The method of claim 9, wherein at least one of the retroreflective element or the mirror is adjustable to reduce stray light from passing through the exit slit.

15. The method of claim 14, wherein: the stray light is Littrow stray light, and the mirror is tilted away from normal incidence.

16. A non-transitory computer-readable storage medium storing instructions, which when executed by a processor cause the processor to:
    allow inward passage of an optical beam through an entrance slit;
    provide a grating element to receive the optical beam and, diffract the optical beam;
    provide a retroreflective element to receive the diffracted optical beam and retroreflect the diffracted optical beam back to the grating element;
    provide a mirror, located adjacent to the entrance slit, to receive the diffracted and retroreflected optical beam from the grating element and reflect the diffracted and retroreflected optical beam back to the grating element, wherein the optical beam passes through the grating element four times, the retroreflective element two times, and the mirror one time; and
    provide an exit slit, adjacent to the entrance slit and the mirror, to allow outward passage of the optical beam that has passed through the grating element four times for a resolution optical measurement.

17. The non-transitory computer-readable storage medium of claim 16, wherein the retroreflective element comprises one of a prism, a flat mirror, or a convex mirror and lens.

18. The non-transitory computer-readable storage medium of claim 16, wherein at least one of the retroreflective element or the mirror is adjustable to reduce stray light from passing through the exit slit.

* * * * *